(12) United States Patent
Pozin (10) Patent No.: US 8,706,753 B2
(45) Date of Patent: Apr. 22, 2014

(54) SEARCH RESULT RANKING WITH SEARCH STRING CERTAINTY WEIGHTING

(75) Inventor: Michael Pozin, Aurora (CA)

(73) Assignee: Oracle International Corporation, Redwood Shores, CA (US)

( * ) Notice: Subject to any disclaimer, the term of this patent is extended or adjusted under 35 U.S.C. 154(b) by 298 days.

(21) Appl. No.: 13/217,463

(22) Filed: Aug. 25, 2011

(65) Prior Publication Data

US 2013/0054586 A1 Feb. 28, 2013

(51) Int. Cl.
*G06F 7/00* (2006.01)
*G06F 17/30* (2006.01)

(52) U.S. Cl.
USPC .......................................... 707/769

(58) Field of Classification Search
None
See application file for complete search history.

(56) References Cited

U.S. PATENT DOCUMENTS

| | | | |
|---|---|---|---|
| 2002/0001468 A1* | 1/2002 | Kaku | 396/310 |
| 2008/0010253 A1* | 1/2008 | Sidhu et al. | 707/3 |
| 2008/0281817 A1* | 11/2008 | White et al. | 707/6 |
| 2009/0287657 A1* | 11/2009 | Bennett | 707/3 |
| 2011/0016111 A1* | 1/2011 | Xie et al. | 707/723 |

* cited by examiner

*Primary Examiner* — Robert Beausoliel, Jr.
*Assistant Examiner* — Michael Pham
(74) *Attorney, Agent, or Firm* — Kraguljac Law Group, LLC (57) ABSTRACT

Systems, methods, and other embodiments associated with search result ranking with certainty weighting are described. In one embodiment, a method includes receiving a search string being input to a search system to retrieve stored artifacts relevant to the search string. A first certainty level associated with a first portion of the search string is determined and a second certainty level associated with a second portion of the search string is determined. Artifacts retrieved by execution of the search string are ranked to produce a search result. The ranking is based, at least in part, on whether a retrieved artifact is relevant to the first portion or the second portion of the search string.

20 Claims, 5 Drawing Sheets

SEARCH RESULT RANKING WITH SEARCH STRING CERTAINTY WEIGHTING

BACKGROUND

Searches of the World Wide Web and even enterprise level content management systems typically return an overwhelming number of "hits" (stored artifacts such as documents that contain all or part of a search string or terms related to the search string). This makes it difficult in most searches for a user to examine the comprehensive list of hits to select a document for retrieval. Thus, the ranking of search results plays an important role in search systems. Ranking allows a search system to present hits to a user in order of likely relevance to facilitate selection by the user of an artifact from the large number of hits.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. One of ordinary skill in the art will appreciate that in some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems and methods are described herein that provide search result ranking with search string certainty weighting. Search result ranking with search string certainty weighting associates a certainty level with various portions of an input search string. The certainty level is determined based on some characteristic of the user's entry of the search string. Thus, by attaching a certainty level to portions of the search string, the systems and methods described herein seek to interpret a user's behavior to determine a level of certainty the user has in the accuracy of various portions of the search string.

Search result ranking with search string certainty weighting ranks hits that are relevant to search string portions having higher certainty above hits that are relevant to search string portions that have a lower certainty. The certainty level quantifies the amount of certainty that the user has in the accuracy of various portions of the search string. For example, if a user is inputting a telephone number to be searched and pauses for a significant time between entry of the seventh and eighth digits, this may indicate that while the user is relatively certain about the first seven digits, he is less certain about the accuracy of the last three digits. Search result ranking with search string certainty weighting as disclosed herein will rank retrieved telephone numbers that match the first seven digits higher than telephone numbers that match the last three digits.

Many ranking systems score retrieved hits based on the content of the documents themselves. These types of systems may give a higher relevance score to documents containing search terms that occur less frequently in the system than documents containing search terms that occur more frequently in the system. Some ranking systems score retrieved hits based on a user's context. For example, a search system may score results relevant to a user's particular geographic region higher than results relevant to other geographic regions. However, neither of these types of ranking systems rank results based on a certainty with which the user inputs portions of the search string.

Figure 1:
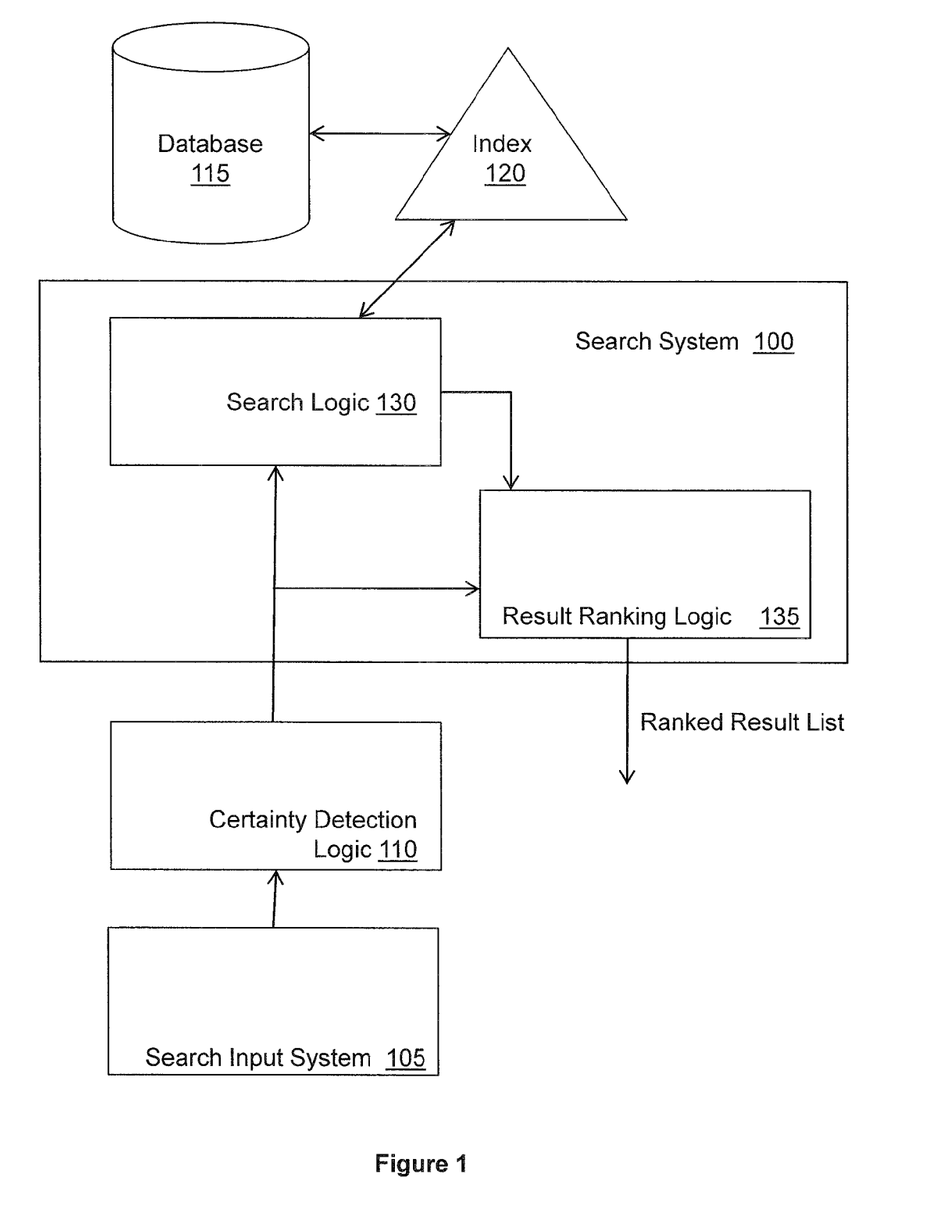
FIG. 1 illustrates one embodiment of a system associated with search result ranking with search string certainty weighting.

Referring now to FIG. 1, one example embodiment of a search system 100 is illustrated. The search system 100 receives and processes search strings from a search input system 105 to locate artifacts stored in a database 115 that are relevant to the search string. One exemplary search system that is well suited for text searches is Oracle Text. Text search systems allow a user to perform keyword searches on text contained in the stored artifacts. To locate artifacts that are relevant to the search string, the search system 100 may access one or more pre-generated indexes 120. The indexes 120 map search terms (or, on a more granular level, tokens) to artifacts stored in the database 115 that contain the search terms. After searching the index 120, the search system provides a ranked result list to the user.

To facilitate search string certainty weighting, a certainty detection logic 110 analyzes one or more characteristics of the inputting of the search string by the user. For example, the certainty detection logic may analyze a time delay between keystrokes that may indicate that a user is uncertain about the keystrokes that follow a relatively long delay. Specific keystrokes, such as a backspace (delete) keystroke may be interpreted by the certainty detection logic as an uncertainty indicator. The certainty detection logic may receive information from a surveillance system that identifies uncertainty gestures performed by a user during search string entry. Uncertainty indicators may include eye movements, head tilts, or other gestures that indicate that the user may be uncertain about the portion of the search string he is about to enter. Thus, the certainty detection system determines a user's certainty level in the accuracy of the entry keystrokes associated with various portions of a search string.

In some embodiments, detection of an uncertainty indicator may be tailored to a specific user by normalizing according to the user's typical behavior. For example, the time between keystrokes for a particular user may be normalized so that the time delay that is interpreted as an uncertainty indicator is shorter for a user who types quickly and longer for a user who types slowly. Facial expressions may be normalized as well so that facial gestures that are unusual for a particular user are interpreted as uncertainty gestures for the user. Thus, if a user repeatedly tilts his head during normal text entry, the head tilt may not be interpreted as an uncertainty indicator. However, a user who rarely tilts his head may trigger an uncertainty indicator when he tilts his head.

The search system 100 includes a search logic 130 to execute the search string to retrieve artifacts relevant to the search string. The search system 100 also includes a result ranking logic 135 configured to rank the retrieved artifacts to produce a ranked result list. The ranking performed by the result ranking logic 135 is based, at least in part, on whether a retrieved artifact is relevant to a search string portion having a higher or lower certainty level.

Figure 2:
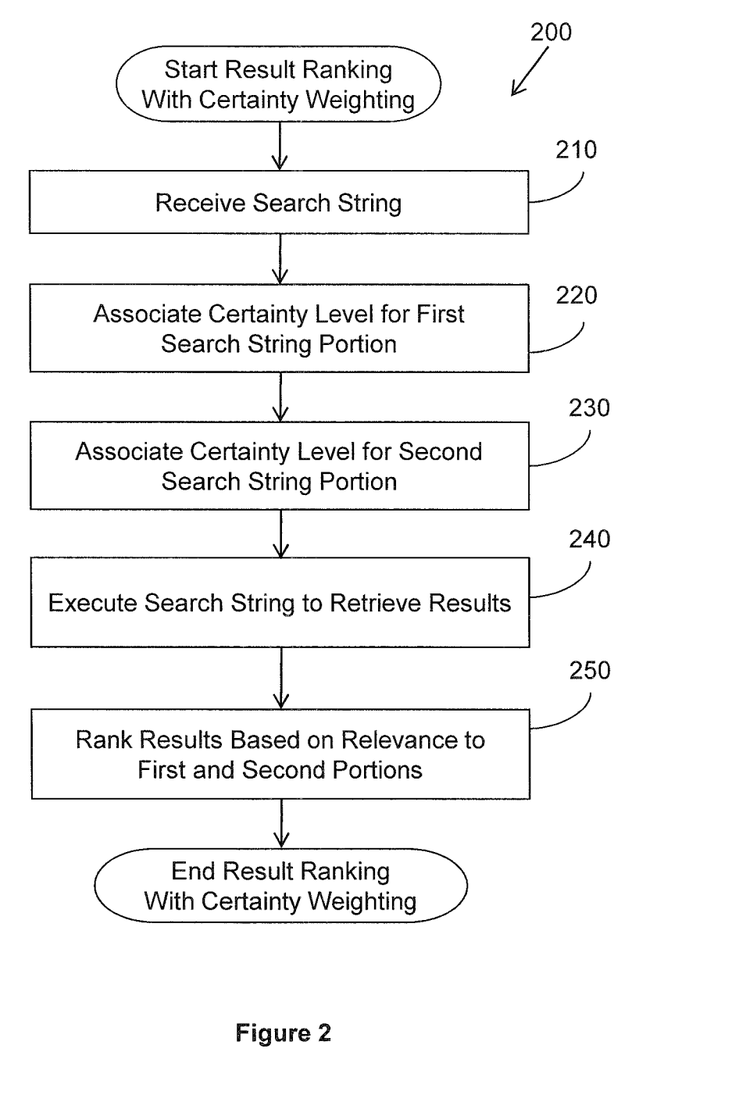
FIG. 2 illustrates one embodiment of a method associated with search result ranking with search string certainty weighting.

Referring now to FIG. 2, an example embodiment of a method 200 for ranking search results based on search string certainty is outlined. At 210, the method includes receiving a search string being input to a search system to retrieve stored artifacts relevant to the search string. At 220, a first certainty level is associated with a first portion of the search string. At 230, a second certainty level is associated with a second portion of the search string. At 240, the search string is executed to retrieve artifacts relevant to the search string. At 250, the method includes ranking the retrieved artifacts to produce a search result. The ranking of an artifact is based, at least in part, on whether a retrieved artifact is relevant to the first portion or the second portion of the search string. While in the example embodiment of FIG. 2, the search string is broken into two portions having two different certainty levels, the search string can be broken into any number of portions each having their own certainty level.

Determining the first certainty level and the second certainty level may be performed by detecting an uncertainty indicator that occurs during the input of the search string. The first certainty level may be assigned to a first portion of the search string that occurs prior to the uncertainty indicator while the second certainty level may be assigned to a second portion of the search string that occurs after the uncertainty indicator. To rank the results, a higher relevancy score may be assigned to artifacts that are relevant to the first portion of the search string than to artifacts that are relevant to the second portion of the search string.

Detecting the uncertainty indicator may be performed by detecting a time delay between keystrokes during entry of the search string that exceeds a delay threshold. The time delay threshold may be determined so that it exceeds a given user's average time between keystrokes. Detection of the uncertainty indicator is accomplished by setting a countdown timer to a time period corresponding to the delay threshold after registering a search string entry keystroke and detecting an uncertainty indicator if the countdown timer reaches zero prior to entry of a subsequent keystroke.

The detecting of the uncertainty indicator may also be performed by detecting a user uncertainty gesture that has been determined to indicate uncertainty with respect to users taken generally. The uncertainty gesture may be determined for a particular user entering the search string based on that user's typical behavior while entering text. The uncertainty gestures may include facial expressions, eye movement, head tilt, moving hands to the head, or moving the head toward or away from the monitor.

A backspace keystroke or delete operation performed by a user may be interpreted as an uncertainty indicator. If it is determined that a user is typically more certain about text that is entered while correcting an entry, portions of the search string that follow the delete operation are given a higher certainty weight than portions that precede the delete operation. If it is determined that a user is typically less certain about text that is entered while correcting an entry, portions of the search string that follow the delete operation are given a lower certainty weight than portions that precede the delete operation.

A user's prior search entries may be used to determine a certainty weighting for portions of a text string. For example, portions of a search string that coincide with search string portions recently entered by the user may be given a higher certainty weight.

Figure 3:
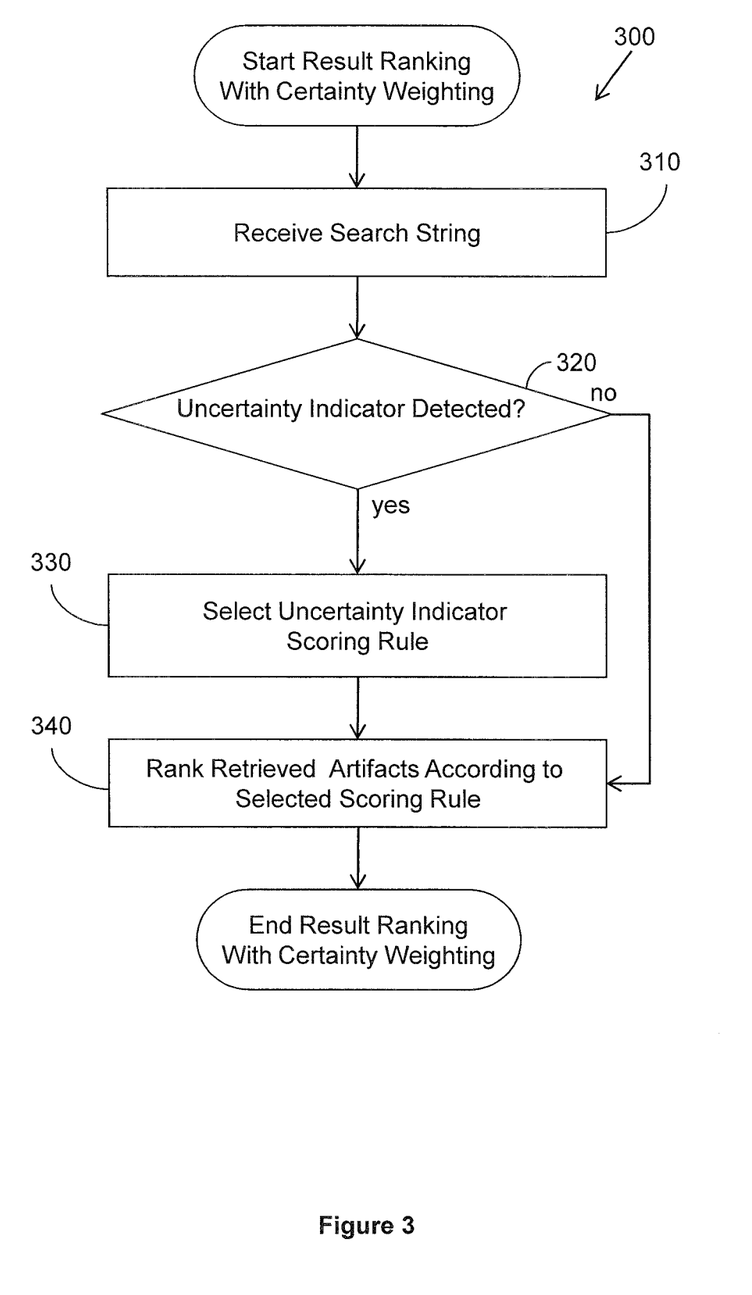
FIG. 3 illustrates an embodiment of a method associated with search result ranking with search string certainty weighting.

FIG. 3 outlines one example embodiment of a method 300 for performing result ranking with search string certainty weighting. At 310, the method includes receiving a search string. At 320, if the search string includes first and second portions separated by an uncertainty indicator, at 330 an uncertainty scoring rule associated with the search string is selected. At 340, the method includes ranking artifacts retrieved by execution of the search string in a search system according to the retrieved scoring rule to produce a search result. If at 320, no uncertainty indicator is detected, at 340 the search results may be sorted according to default scoring rules.

The method outlined in FIG. 3 allows a search system administrator to store uncertainty scoring rules tailored for common types of uncertainty in search string entry. For example, an uncertainty scoring rule may be associated with a specific type of search string. For instance, if the search system recognizes the search string as a telephone number, a rule associated with telephone numbers may specify that retrieved telephone numbers corresponding to portions of the search string that occur before an uncertainty indicator are given higher relevance scores than telephone numbers corresponding to portions of the search string occurring after the uncertainty indicator. Alternatively, a higher certainty weight may be assigned to the area code portion of a telephone number based on the assumption that users rarely forget the area code.

Uncertainty scoring rules may include different scoring methods for names, places, websites, and so on. Uncertainty scoring rules may be stored for individual users, based on their typing speed, typical facial gestures and body language, or other behaviors that can be normalized as discussed above. A user may input the uncertainty scoring rules he wishes to be used in ranking his search results.

Different uncertainty scoring rules may be associated with different types of uncertainty indicators (e.g., keystroke delay, facial expression, gestures). For example, an uncertainty scoring rule for keystroke delay may specify that retrieved artifacts corresponding to portions of the search string that occur before the keystroke delay are given higher relevance scores than artifacts corresponding to portions of the search string occurring after the keystroke delay. Other uncertainty scoring rules may be associated with other uncertainty indicators. A user may be more confident of the portion of the search string input after he moves his eyes as if recalling information. In that case, an uncertainty scoring rule for eye movement may specify that retrieved artifacts corresponding to portions of the search string that occur after the eye movement are given higher relevance scores than artifacts corresponding to portions of the search string occurring before the eye movement.

Figure 4:
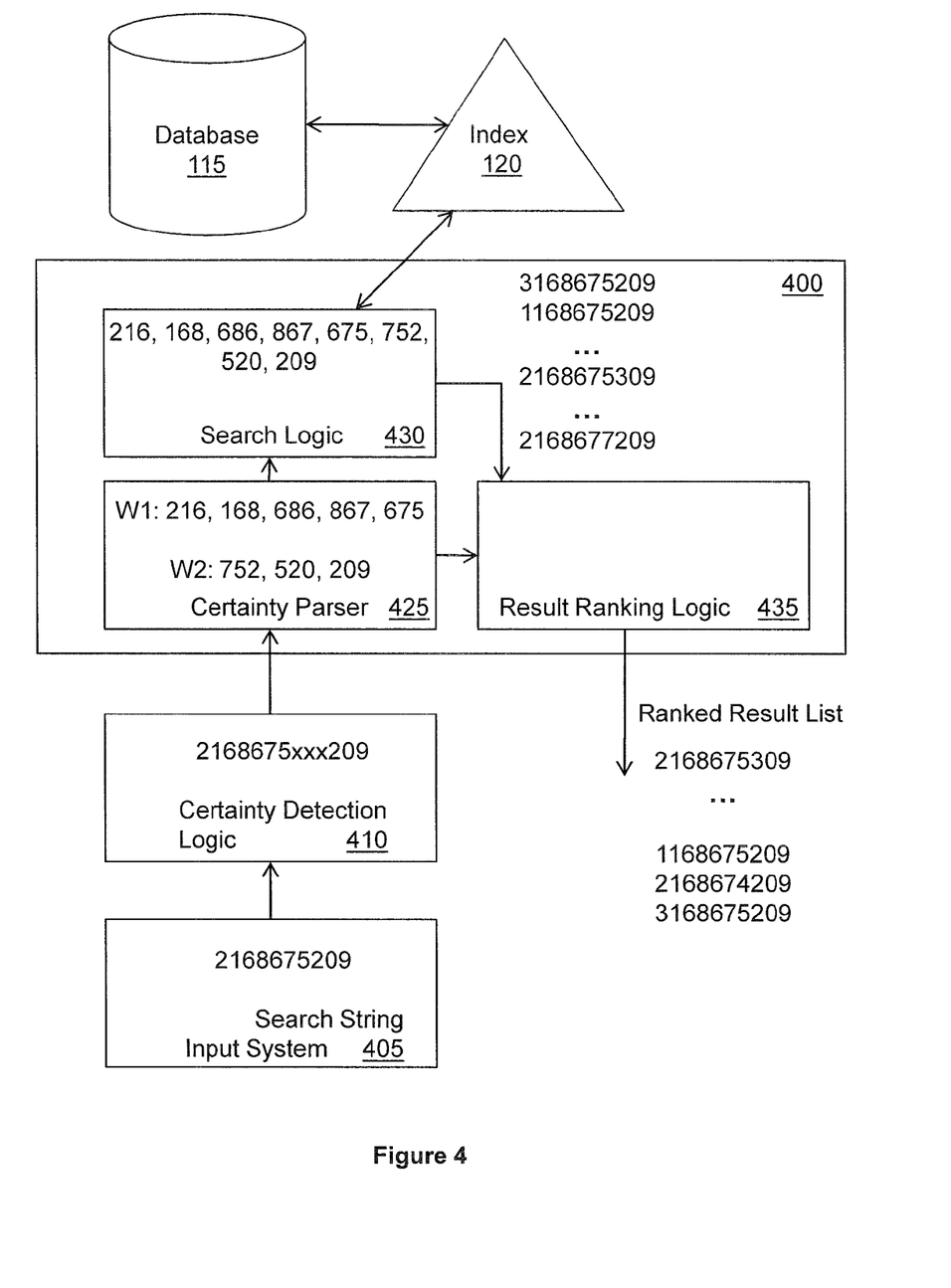
FIG. 4 illustrates another embodiment of a system associated with search result ranking with search string certainty weighting.

Referring now to FIG. 4, one example embodiment of a search system 400 is illustrated. Like the search system 100 of FIG. 1, the search system 400 receives and processes search strings from a search string input system 405 to locate artifacts stored in a database 115 that are relevant to the search string. A certainty detection logic 410 analyzes one or more certainty indicating characteristics of the inputting of the search string by the user. The search system 400 includes a search logic 430 to execute the search string to retrieve artifacts relevant to the search string and a result ranking logic 435 configured to rank the retrieved artifacts to produce a ranked result list. The ranking performed by the result ranking logic 435 is based, at least in part, on a level of certainty associated with portions of the search string.

The search system 400 also includes a certainty parser 425 configured to parse the search string into search string tokens.

The certainty parser 425 assigns a certainty level weight associated with the first portion of the search string to tokens parsed from the first portion of the search string. Likewise, the certainty parser 425 assigns a certainty level weight associated with the second portion of the search string to tokens parsed from the second portion of the search string. The result ranking logic 435 is configured to rank the retrieved artifacts by assigning a higher relevancy score to artifacts that are relevant to the tokens having a higher certainty level weight than to artifacts that are relevant to tokens having a lower certainty level weight.

By way of example, FIG. 4 illustrates an instance of search result ranking with search string certainty weighting. A user is searching for information associated with a telephone number. The user types in 2 1 6 8 6 7 5 and then pauses for five seconds as he tries to remember if that was 5209 or 5309. The user then guesses (incorrectly) "2" and enters 2 0 9. The certainty detection logic 410 registers this keystroke delay between the 5 and the 2. This uncertainty indicator is communicated to the certainty parser 425 that parses the search string into three-character tokens. The certainty parser 425 assigns a first weight to the tokens that include the keystrokes that occurred before the keystroke delay and a second weight to the tokens that include keystrokes that occurred after the keystroke delay.

The search logic 430 executes the search string to return a very long list of telephone numbers that are only one digit away from the telephone number typed in by the user. The correct number (2168675309) is listed near the bottom of the list. If the results were presented to the user in this order, it is unlikely that the user would ever reach the results page with the desired phone number. The result ranking logic 435 uses the weighting information assigned to the tokens by the certainty parser 425 to give a higher rank to the results that match the part of the telephone number entered prior to the keystroke delay. This pulls the intended number to the top of the results list.

In the example embodiment of FIG. 4, one particular approach to applying more weight to portions of a search string that have a higher certainty level was described. However, many other techniques can be employed to assign a higher weight to a search string portion that was input by a user in a manner indicating that user has a higher confidence in the accuracy of the portion. Once the certainty weighting of various search string portions has been accomplished, any number of result ranking techniques that take into account weighting of search string portions may be used.

More than two certainty levels and search string portions may be used. In the above example, if the user had typed 216 (short pause) 867 (long pause) 530 (short pause) 9, the search string could be divided into four different string portions. 216, 867, and 9 could be assigned a higher certainty than 530, which occurred after a longer pause. Further, just the single character following the pause could be assigned the lower certainty as opposed to the entire string portion following the pause. In this case, tokens associated with the single character (5) would be assigned the lower certainty weight.

Figure 5:
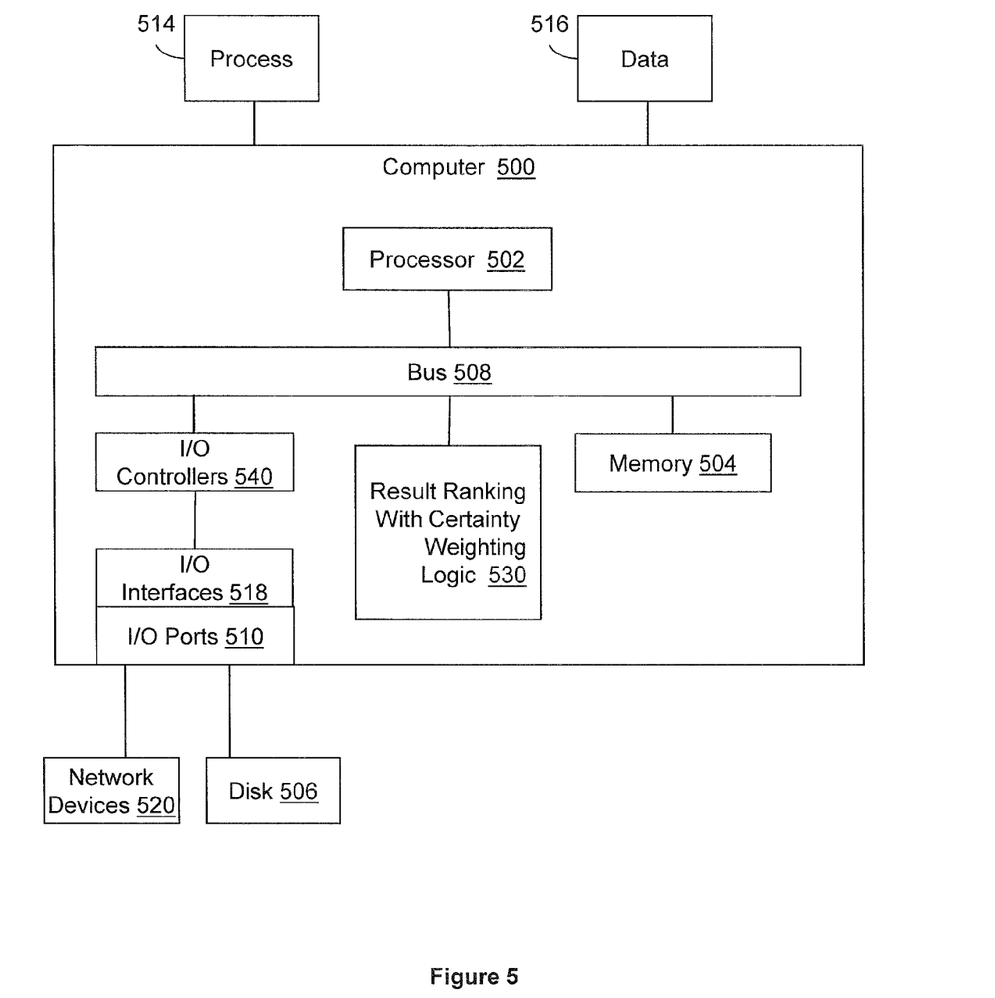
FIG. 5 illustrates an embodiment of a computing system in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a result ranking with certainty weighting logic 530 configured to facilitate search result ranking. In different examples, the result ranking with certainty weighting logic 530 may be implemented in hardware, a non-transitory computer-readable medium with stored instructions, firmware, and/or combinations thereof. While the result ranking with certainty weighting logic 530 is illustrated as a hardware component attached to the bus 508, it is to be appreciated that in one example, the result ranking with certainty weighting logic 530 could be implemented in the processor 502.

In one embodiment, result ranking with certainty weighting logic 530 is a means (e.g., hardware, non-transitory computer-readable medium, firmware) for search result ranking based on search string certainty.

The means may be implemented, for example, as an ASIC programmed to perform search result ranking based on search string certainty. The means may also be implemented as stored computer executable instructions that are presented to computer 500 as data 516 that are temporarily stored in memory 504 and then executed by processor 502.

In one embodiment, the instructions include receiving a search string being input to a search system to retrieve stored artifacts relevant to the search string; determining a first certainty level associated with a first portion of the search string and a second certainty level associated with a second portion of the search string; executing the search string to retrieve artifacts relevant to the search string; and ranking the retrieved artifacts to produce a search result, where the ranking is based, at least in part, on whether a retrieved artifact is relevant to the first portion or the second portion of the search string.

Generally describing an example configuration of the computer 500, the processor 502 may be a variety of various processors including dual microprocessor and other multiprocessor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the various methods described herein, for example, with reference to FIGS. 1-4.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, a non-transitory computer readable medium that stores instructions, instructions in execution on a machine, and/or combinations of each to perform a function (s) or an action(s), and/or to cause a function or action from another logic, method, and/or system. Logic may include a microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer cause the computer to perform a method, the method comprising:
   receiving a search string being input to a search system to retrieve stored artifacts relevant to the search string;
   determining a first certainty level associated with a first portion of the search string and a second certainty level associated with a second portion of the search string, where the certainty level associated with a given portion of a search string estimates a level of certainty that a user that entered the search string has in the accuracy of the portion of the given search string;
   executing the search string to retrieve artifacts relevant to the search string; and
   ranking the retrieved artifacts to produce a search result, where the ranking is based, at least in part, on whether a retrieved artifact is relevant to the first portion or the second portion of the search string.

2. The non-transitory computer-readable medium of claim 1 where determining the first certainty level and the second certainty level comprises:
   detecting an uncertainty indicator that occurs during the input of the search string;
   assigning the first certainty level to the first portion of the search string that occurs prior to the uncertainty indicator; and
   assigning the second certainty level to the second portion of the search string that occurs after the uncertainty indicator.

3. The non-transitory computer-readable medium of claim 2, where detecting the uncertainty indicator comprises detecting a delete operation during entry of the search string.

4. The non-transitory computer-readable medium of claim 2, where detecting the uncertainty indicator comprises detecting a time delay between keystrokes during entry of the search string that exceeds a delay threshold.

5. The non-transitory computer-readable medium of claim 4, where detecting the time delay comprises setting a countdown timer to a time period corresponding to the delay threshold after registering a search string entry keystroke and detecting an uncertainty indicator if the countdown timer reaches zero prior to entry of a subsequent keystroke.

6. The non-transitory computer-readable medium of claim 2, where the detecting of the uncertainty indicator comprises comparing selected characteristics of the user behavior during input of the search string to normalized characteristics of the user behavior.

7. The non-transitory computer-readable medium of claim 2, where the detecting of the uncertainty indicator comprises detecting a user uncertainty gesture.

8. The non-transitory computer-readable medium of claim 7, where the uncertainty gesture comprises a predetermined user facial expression.

9. A computing system, comprising:
a processor;
a certainty detection logic configured to cause the processor to determine a certainty level associated with a first and second portion of a search string, where the certainty level associated with a given portion of a search string estimates a level of certainty that a user that entered the search string has in the accuracy of the portion of the given search string; and
a search logic to execute the search string in a search system to retrieve artifacts relevant to the search string; and
a result ranking logic configured to cause the processor to rank the retrieved artifacts to produce a search result, where the ranking is based, at least in part, on whether a retrieved artifact is relevant to the first portion or the second portion of the search string.

10. The computing system of claim 9 further comprising a certainty parser configured to parse the search string into search string tokens and to assign a certainty level associated with the first portion of the search string to tokens parsed from the first portion of the search string and to assign a certainty level associated with the second portion of the search string to tokens parsed from the second portion of the search string.

11. The computing system of claim 9 where the certainty detection logic is configured to detect an uncertainty indicator that occurs during input of the search string.

12. The computing system of claim 11 further comprising a certainty parser configured to parse the search string into search string tokens and to assign the first certainty level weight to tokens parsed from a portion of the search string that occurs prior to the uncertainty indicator; and to assign the second certainty level weight to a second portion to tokens parsed from a portion of the search string that occurs after the uncertainty indicator.

13. The computing system of claim 12 where the result ranking logic is configured to rank the retrieved artifacts by assigning a higher relevancy score to artifacts that are relevant to the first portion of the search string over artifacts that are relevant to the second portion of the search string.

14. The computing system of claim 9 where the certainty detection logic is configured to detect a time delay between keystrokes during entry of the search string that exceeds a delay threshold.

15. The computing system of claim 9 where the certainty detection logic is configured to detect a user uncertainty gesture.

16. A computer-implemented method comprising:
receiving a search string that includes first and second portions separated by an uncertainty indicator that occurred during input of the search string by a user, the first portion occurring before the uncertainty indicator and the second portion occurring after the uncertainty indicator;
selecting an uncertainty scoring rule associated with the search string, where the uncertainty scoring rule estimates, based at least in part, on the uncertainty indicator, a level of certainty that the user has in the accuracy of the first and second portions of the search string;
ranking artifacts retrieved by execution of the search string in a search system according to the retrieved scoring rule to produce a search result.

17. The computer-implemented method of claim 16 where the uncertainty scoring rule specifies that a higher relevance score is to be associated with the first portion.

18. The computer-implemented method of claim 16 comprising determining a search string type for the search string and selecting an uncertainty scoring rule associated with the search string type.

19. The computer-implemented method of claim 16 comprising determining an identity of the user inputting the search string and selecting an uncertainty scoring rule associated with the identified user.

20. The computer-implemented method of claim 16 comprising determining an uncertainty indicator type for the uncertainty indicator and selecting an uncertainty scoring rule associated with the uncertainty indicator type.

* * * * *

UNITED STATES PATENT AND TRADEMARK OFFICE
CERTIFICATE OF CORRECTION

PATENT NO. : 8,706,753 B2
APPLICATION NO. : 13/217463
DATED : April 22, 2014
INVENTOR(S) : Pozin Page 1 of 1

It is certified that error appears in the above-identified patent and that said Letters Patent is hereby corrected as shown below:

In the Claims,

In column 9, line 23, in Claim 9, after "string;" delete "and".

Signed and Sealed this
Twenty-third Day of June, 2015

Michelle K. Lee
*Director of the United States Patent and Trademark Office*